(12) United States Patent
Shiomi

(10) Patent No.: US 6,320,613 B1
(45) Date of Patent: Nov. 20, 2001

(54) IMAGE BLUR PREVENTION APPARATUS INCLUDING DEVICE FOR VARYING SAMPLING PERIOD FOR SAMPLING AN OPERATING SIGNAL FOR IMAGE BLUR PREVENTION DEVICE

(75) Inventor: Yasuhiko Shiomi, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/942,050

(22) Filed: Oct. 1, 1997

Related U.S. Application Data

(63) Continuation of application No. 08/490,131, filed on Jun. 14, 1995, now abandoned.

(30) Foreign Application Priority Data

Jun. 15, 1994 (JP) .................................... 6-133128

(51) Int. Cl.⁷ ..................... H04N 5/225; H04N 5/228; G03B 13/00
(52) U.S. Cl. .................. 348/208; 348/347; 348/351; 348/357; 348/360; 348/363; 348/374; 396/54; 396/55
(58) Field of Search ................... 348/207, 208, 348/345, 347, 348, 349, 350, 351, 352, 354, 355, 356, 357, 362, 363, 364, 366–368, 296, 373, 374, 360; 396/52, 53, 54, 55; H04N 5/228, 5/225; G03B 13/00

(56) References Cited

U.S. PATENT DOCUMENTS

| | | |
|---|---|---|
| 5,053,804 | 10/1991 | Okada et al. ......................... 354/484 |
| 5,075,776 * | 12/1991 | Cheung ................................. 358/222 |
| 5,175,580 | 12/1992 | Shiomi .................................. 354/410 |
| 5,192,964 * | 3/1993 | Shinohara et al. ................... 354/202 |
| 5,309,250 * | 5/1994 | Giacometti ........................... 358/406 |
| 5,365,304 * | 11/1994 | Hamada et al. ...................... 354/430 |
| 5,389,997 * | 2/1995 | Ohishi .................................. 354/430 |
| 5,541,693 * | 7/1996 | Enomoto .............................. 354/202 |
| 5,615,397 * | 3/1997 | Shiomi ................................... 396/55 |
| 5,801,769 * | 9/1998 | Hirose .................................. 348/208 |
| 5,861,915 * | 1/1999 | Sato ....................................... 396/55 |
| 5,937,214 * | 8/1999 | Shintani ................................. 396/55 |
| 5,995,761 * | 11/1999 | Wakabayashi ......................... 396/54 |
| 6,067,419 * | 5/2000 | Shiomi ................................... 396/55 |
| 6,088,533 * | 7/2000 | Shiomi ................................... 396/52 |
| 6,163,651 * | 12/2000 | Washisu ................................. 396/55 |

* cited by examiner

*Primary Examiner*—Wendy R. Garber
*Assistant Examiner*—Ngoc-Yen Vu
(74) *Attorney, Agent, or Firm*—Fitzpatrick, Cella, Harper & Scinto

(57) ABSTRACT

An image blur prevention apparatus includes a device that varies the sampling period of a signal used in image blur prevention. In an exposure operation, the sampling period is shortened to achieve image blur prevention with high precision (in the exposure operation, image blur prevention with high precision is required). In a non-exposure operation, the sampling period is set to be relativelylong to reduce the load on a calculation circuit (in the non-exposure operation; before exposure, a calculation for determining the exposure conditions is performed, and the load on the calculation circuit becomes great).

10 Claims, 14 Drawing Sheets

| FIG. 1A |
|---------|
| FIG. 1B |

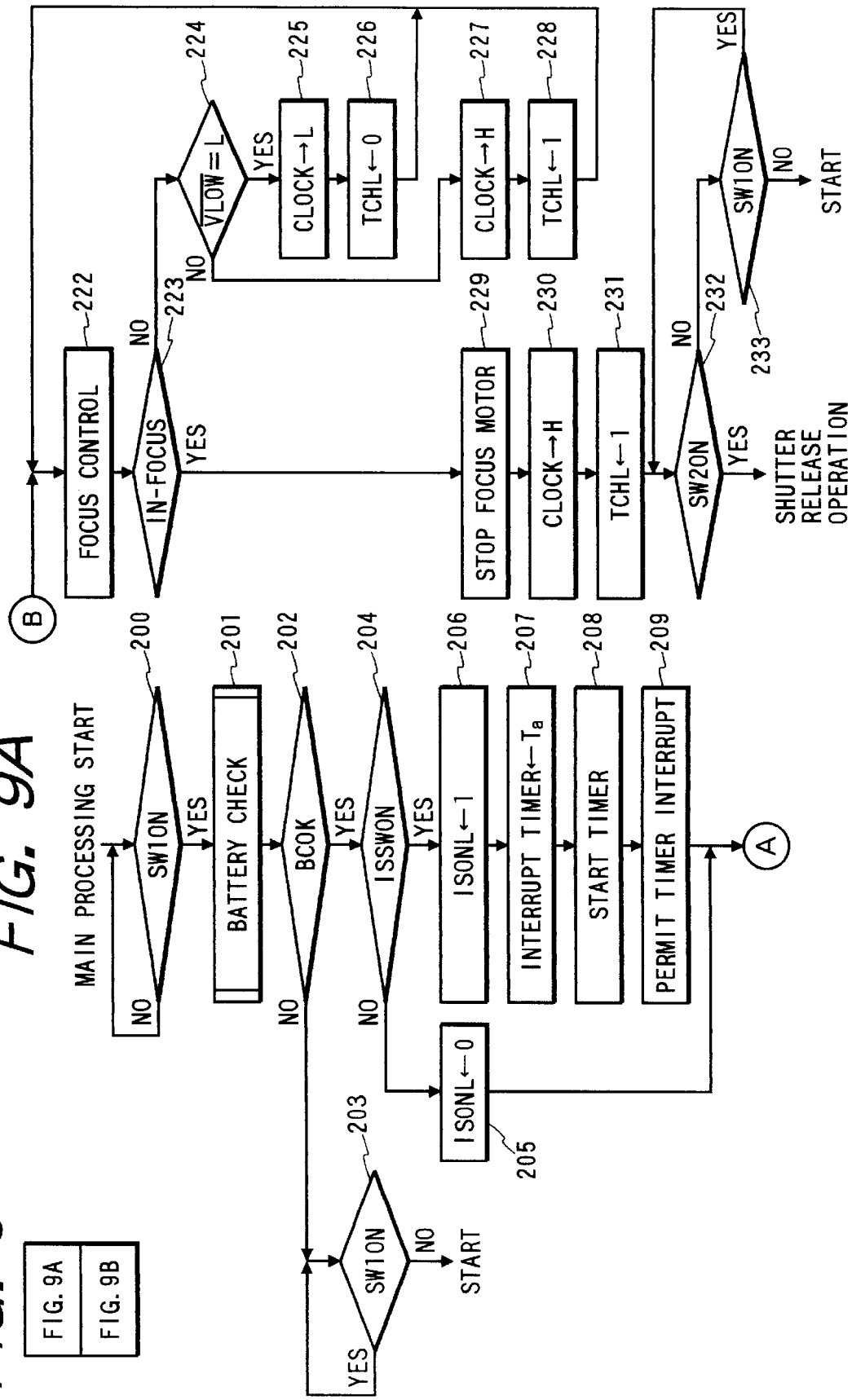

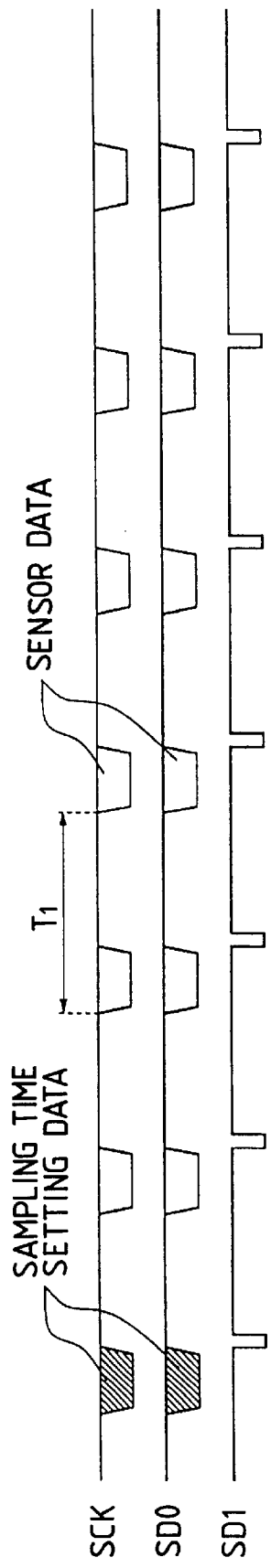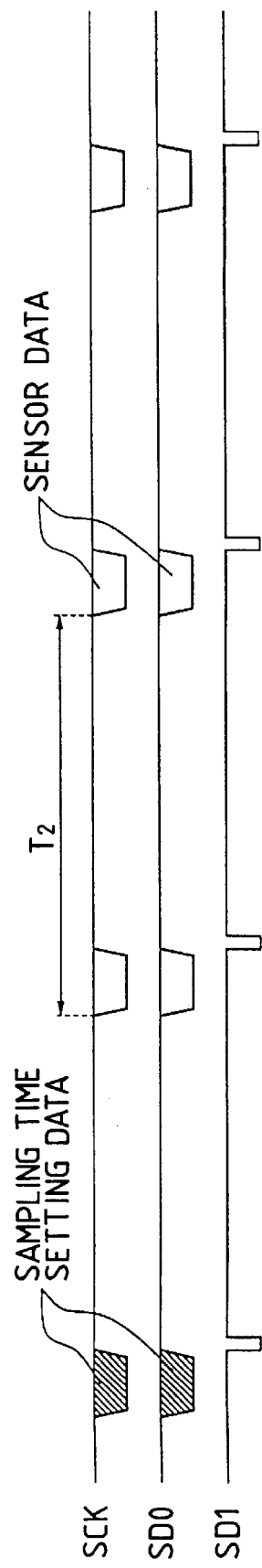

IMAGE BLUR PREVENTION APPARATUS INCLUDING DEVICE FOR VARYING SAMPLING PERIOD FOR SAMPLING AN OPERATING SIGNAL FOR IMAGE BLUR PREVENTION DEVICE

This application is a continuation of application Ser. No. 08/490,131 filed Jun. 14, 1995, now abandoned.

BACKGROUND OF THE INVENTION

1. Field of the Invention

The present invention relates to an apparatus used to prevent an image blur in a camera, optical equipment, or the like.

2. Related Background Art

Conventionally, in an image blur prevention system used in a camera, not only a hand vibration but also a vibration (image blur) of a camera body caused by a shock of a mechanical member such as a mirror, a shutter, or the like must be suppressed to some extent. For this purpose, the frequency band of image blur prevention performance itself is extended toward the high-frequency side.

However, in the conventional method, as the frequency band is extended to the high-frequency side, the calculation speed in a CPU, the sampling speed of input data, and the transfer rate or transfer interval of output data must fulfill high-speed requirements. In particular, when the CPU simultaneously executes another sequence control for the camera, the load on the CPU itself undesirably becomes very heavy.

SUMMARY OF THE INVENTION

One aspect of the invention is to provide an apparatus used for image blur prevention, comprising:

a variable portion for changing a sampling period for sampling a signal used for image blur prevention.

With this arrangement, when high image blur prevention precision is required, image blur prevention is attained with high precision.

Another aspect of the invention is to provide an apparatus used for image blur prevention, comprising:

a variable portion for changing a signal input period of a signal which is input to a calculation circuit for performing a calculation for image blur prevention and is used for the calculation.

With this arrangement, the calculation circuit can perform a calculation for image blur prevention which satisfies the required precision of image blur prevention, the load on the calculation circuit, and the like.

BRIEF DESCRIPTION OF THE DRAWINGS

FIGS. 12A and 12B are timing charts showing the timings of communications executed by the arrangement shown in FIG. 11.

DETAILED DESCRIPTION OF THE PREFERRED EMBODIMENTS

FIRST EMBODIMENT

Figures 1, 1A:
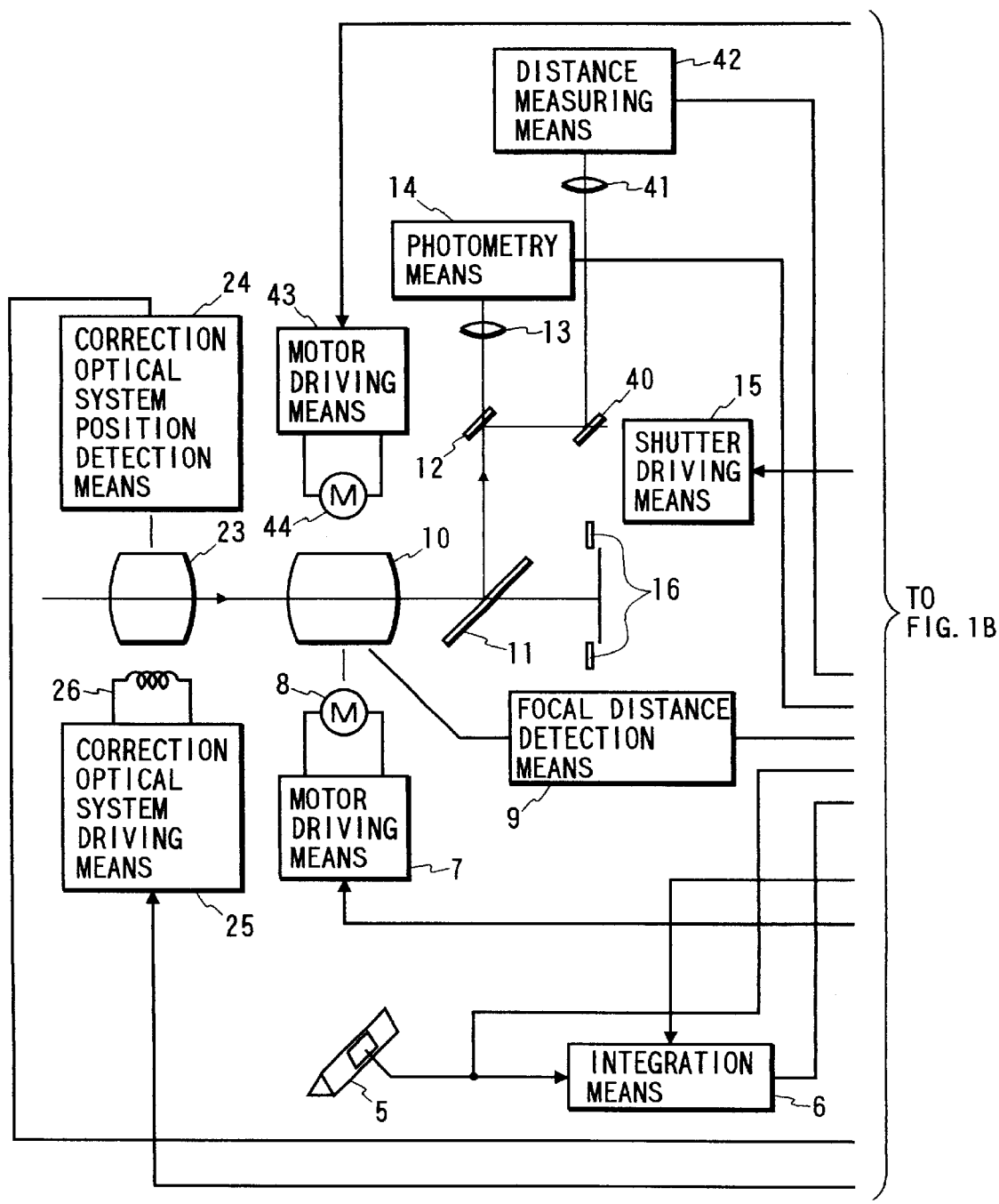
FIG. 1 is comprised of FIGS. 1A and 1B showing block diagrams of the overall arrangement according to the first embodiment of the present invention.
Figure 1B:
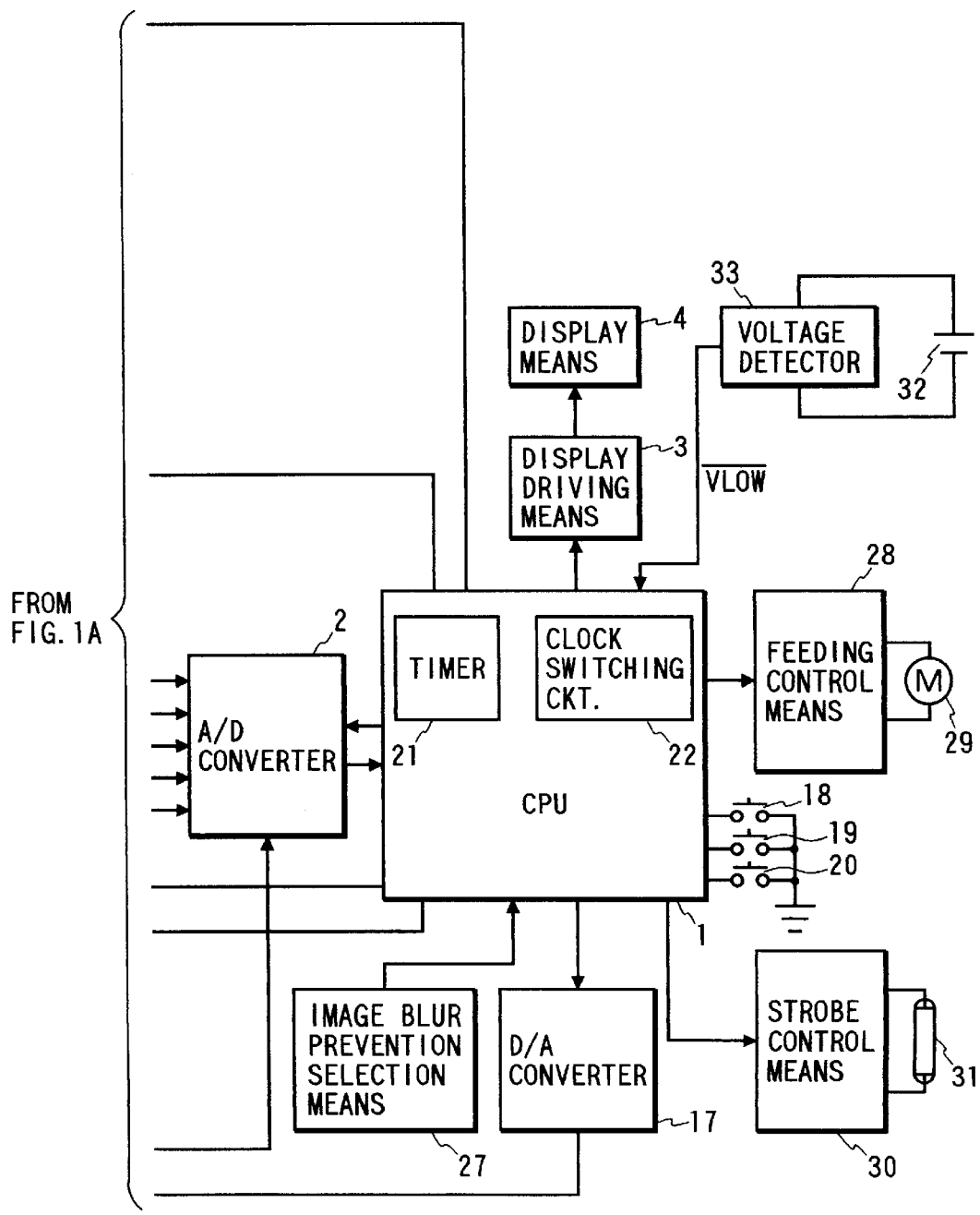

FIGS. 1A and 1B are block diagrams showing the overall arrangement according to the first embodiment of the present invention. A CPU 1 concurrently controls the entire camera and an image blur prevention system.

An output from a vibration sensor 5 for detecting the vibration of the entire camera is directly input to an A/D converter 2, and is also input to the A/D converter 2 via an integration means 6.

Figure 2:
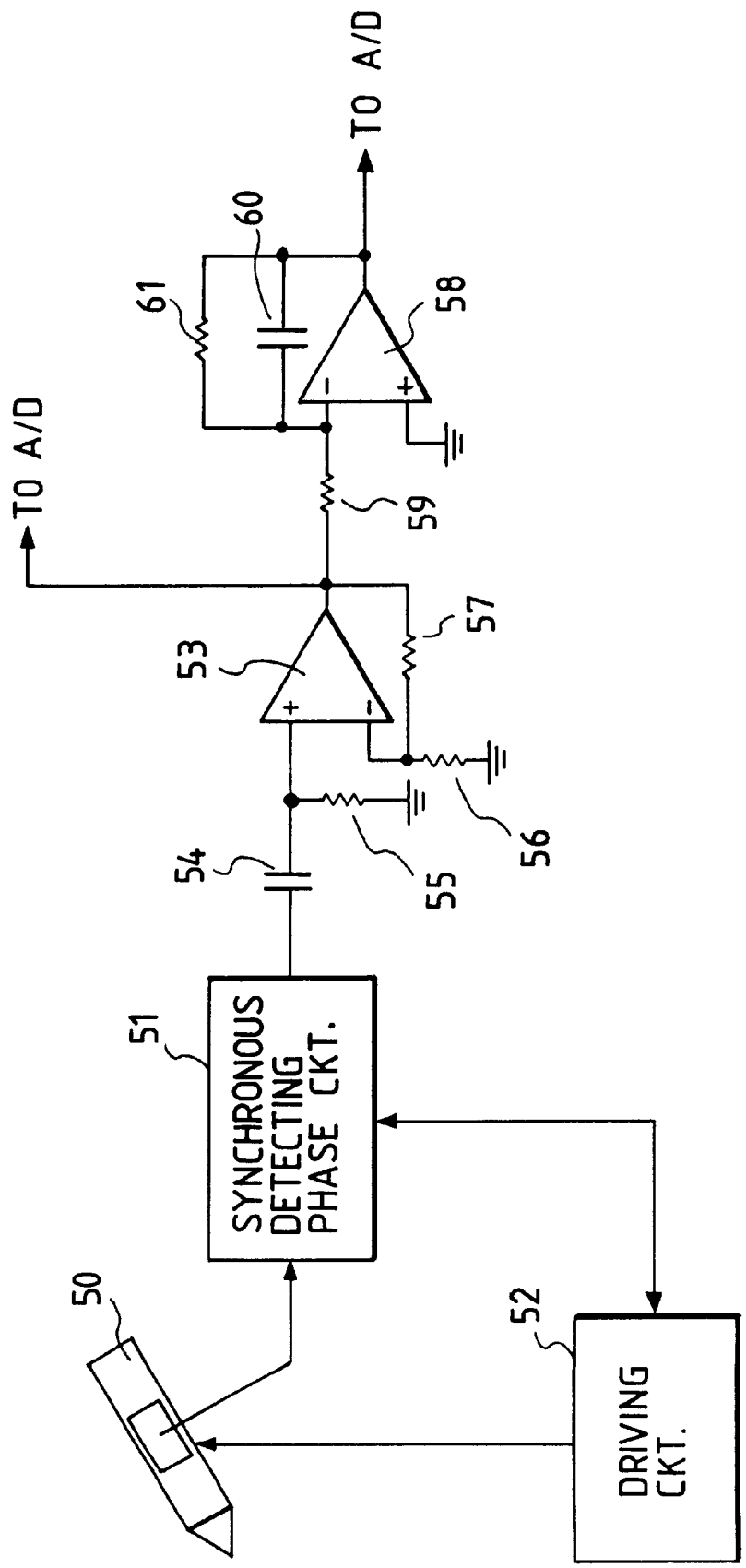
FIG. 2 is a circuit diagram showing the detailed arrangement of a sensor 5 and an integration means 6 shown in FIG. 1A.

FIG. 2 shows the detailed arrangement of the sensor 5 and the integration means 6. The vibration sensor comprises a vibration gyro utilizing a Coriolis' force. A vibrator 50 of the vibration gyro is resonance-driven by a driving circuit 52, and a predetermined angular velocity is extracted by a synchronous detecting phase circuit 51. Furthermore, the output from the circuit 52 normally includes a DC component which is not related to a vibration signal, and in order to remove this component, a high-pass filter constituted by an OP amplifier 53, a capacitor 54, and resistors 55, 56, and 57 is arranged. Therefore, the output from the OP amplifier 53 is input to the A/D converter 2, as shown in FIG. 1B. The output from the OP amplifier 53 is also input to an integration circuit constituted by an OP amplifier 58, resistors 59 and 61, and a capacitor 60, and this circuit converts the angular velocity into an angular displacement. In this manner, the output from the vibration sensor and its converted output are converted into digital data by the A/D converter 2, and these data are supplied to the CPU 1 so as to be subjected to predetermined calculations.

On the other hand, the actual moving amount of a correction optical system 23, which is arranged in a portion of a photographing lens system 10 or is attached to, e.g., the front surface thereof, is detected by a correction optical system position detection means 24, and its output is supplied to the CPU 1 via the A/D converter 2. In the CPU 1, a feedback calculation is executed, so that the output from the vibration sensor becomes equal to the position output of the correction optical system, and the calculation result is supplied to a correction optical system driving means 25 via a D/A converter 17.

The correction optical system driving means 25 supplies driving electric power to a correction optical system driving coil 26, and the correction optical system 23 is driven by an electromagnetic force generated by the coil 26. For this reason, when the output per unit angle detected by the vibration sensor is set to be equal to the output per unit correction angle of the correction optical system, a sufficient vibration prevention operation for a hand vibration can be realized.

Figure 3:
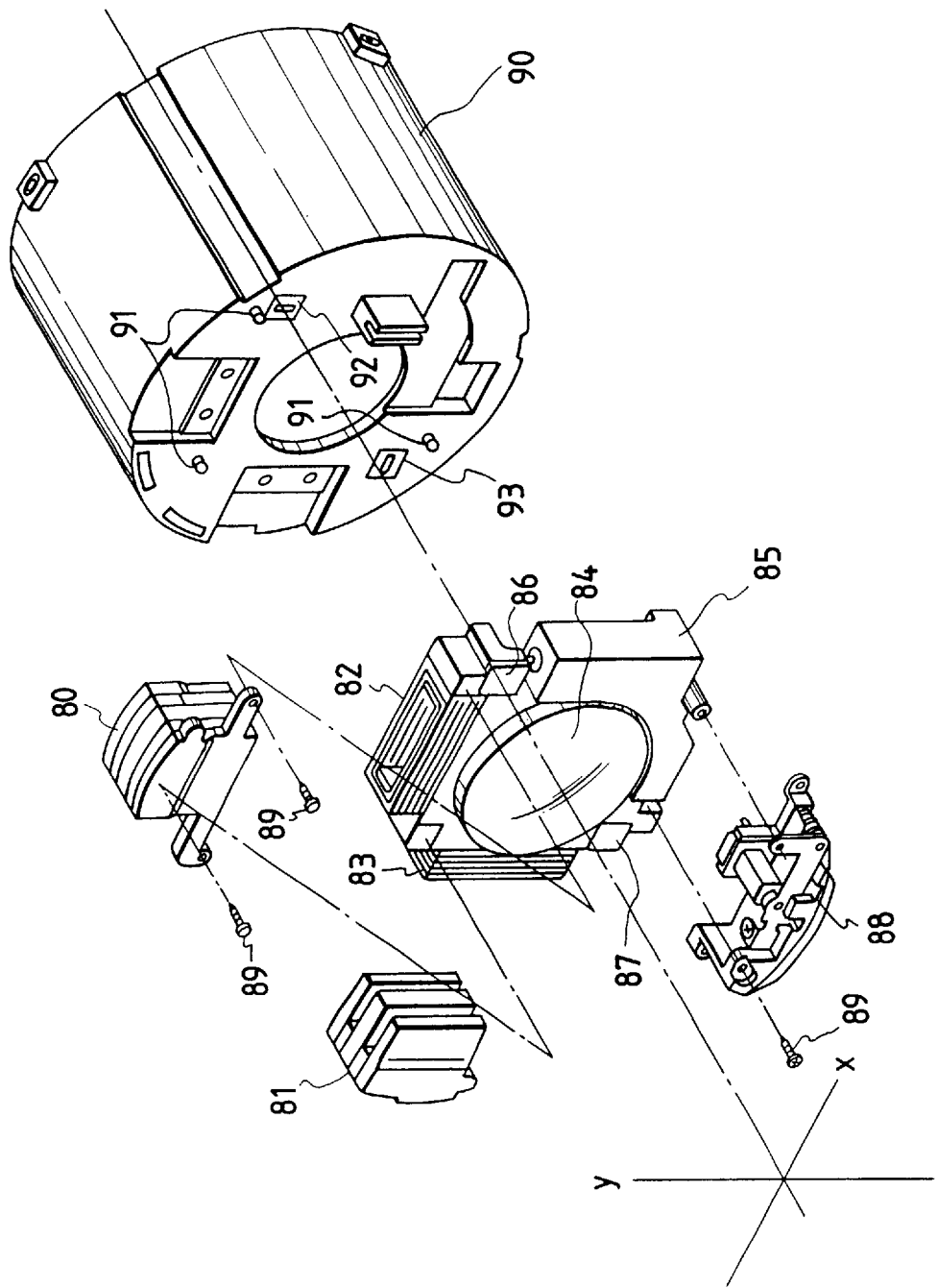
FIG. 3 is an exploded perspective view showing the detailed arrangement of a correction optical system 23 shown in FIG. 1B.

FIG. 3 shows the detailed arrangement of the correction optical system 23. The correction optical system shown in FIG. 3 exemplifies the arrangement of a so-called shift optical system which decenters the optical path of light incident on the photographing optical system of the camera by translating a lens in the x- and y-axis directions perpendicular to the optical axis. In FIG. 3, yoke portions 80 and 81 respectively constitute magnetic circuit units serving as actual driving sources in the x- and y-axis directions, and coils 82 and 83 are paired with these yoke portions 80 and 81. Thus, when electric power is supplied from the above-mentioned correction optical system driving means 25 to these coils, a lens 84 as a portion of the photographing lens system is decentered in the x- and y-axis directions shown in FIG. 3. A support frame & support arm 85 is used for fixing the lens 84. The actual movement of this shift lens is detected in a non-contact manner by combinations of iREDs 86 and 87 which move integrally with the lens, and PSDs 92 and 93 which are attached to a lens barrel portion 90 for holding the entire shift lens. A mechanical lock mechanism 88 holds the lens at substantially the central position of the optical axis when energization to this shift system is stopped. In addition, FIG. 3 illustrates charge pins 89 and support balls 91 serving as tilt stoppers for limiting the movement of the shift system in the tilt direction.

The detailed control state of this embodiment will be described below with reference to the flow charts in 4A, 4B, 5 and 6.

In step 100, it is checked if a switch SW1 (18 in FIG. 1B) is turned on upon a release operation of the camera. If Y (YES) in step 100, the flow immediately advances to step 101 to check if the power supply voltage is high enough to guarantee the operation of the entire system. If it is determined in step 102 that the power supply voltage is equal to or lower than a predetermined level, the subsequent release operation is inhibited, and the control waits until the switch SW1 is turned off in step 103.

On the other hand, if it is determined in step 102 that the power supply voltage is higher than the predetermined level, a photometry calculation for determining the actual shutter exposure conditions is executed in step 104. More specifically, as shown in FIGS. 1A and 1B, incident light which is incident from the object surface via the correction optical system 23 and the photographing optical system 10 is reflected by a main mirror 11, and is incident on a photometry means 14, constituted by a photometry sensor and its peripheral circuits, via a sub mirror 12 and a photometry optical system 13. The light is converted by the photometry means 14 into a voltage corresponding to the object luminance level, and the voltage is supplied to the CPU 1 as data via the above-mentioned A/D converter 2.

In step 105, incident light, which is incident via the correction optical system 23 and the photographing optical system 10, is incident on a distance measuring means 42 via the main mirror 11, the sub mirror 12, a sub mirror 40, and an AF optical system 41, and focus driving control is executed by a motor driving means 43 and a motor 44 on the basis of the distance measurement result.

In step 106, the distance measuring means checks if an in-focus state is detected. If N (NO) in step 106, the flow returns to step 105 to repeat the above-mentioned operation.

If Y in step 106, it is checked in step 107 if a selection switch (ISSW; a switch 20 in FIG. 1B) for selecting whether or not an image blur prevention operation is to be executed is turned on. If N in step 107, the flow advances to step 108 to reset an internal latch ISONL of the CPU 1 to be 0, and thereafter, the flow jumps to step 113.

On the other hand, if the switch ISSW is ON in step 107, it is determined that an image blur prevention operation is selected, and the flow advances to step 109 to set the internal latch ISONL of the CPU 1 to be 1.

Furthermore, time data of a timer (21 in FIG. 1B), which generates an interrupt request to the CPU 1 every predetermined time $T_1$, is set in step 110, and the time measurement of this timer is started in step 111. At the same time, the interrupt operation of this timer 21 is permitted in step 112.

Subsequently, it is checked in step 113 if a switch SW2 (19 in FIG. 1B) serving as a start switch for starting the shutter opening/closing operation of the camera is ON. If N in step 113, it is checked in step 114 if the switch SW1 is ON. If Y in step 114, the flow returns to step 113 to repeat the above operation.

In this manner, since a photographer is in the process of determining framing while looking into a finder before the switch SW2 of the camera is turned on, the image blur prevention control is executed in the above-mentioned timer interrupt processing every predetermined period until then, as a matter of course.

Figures 4, 4A, 4B:
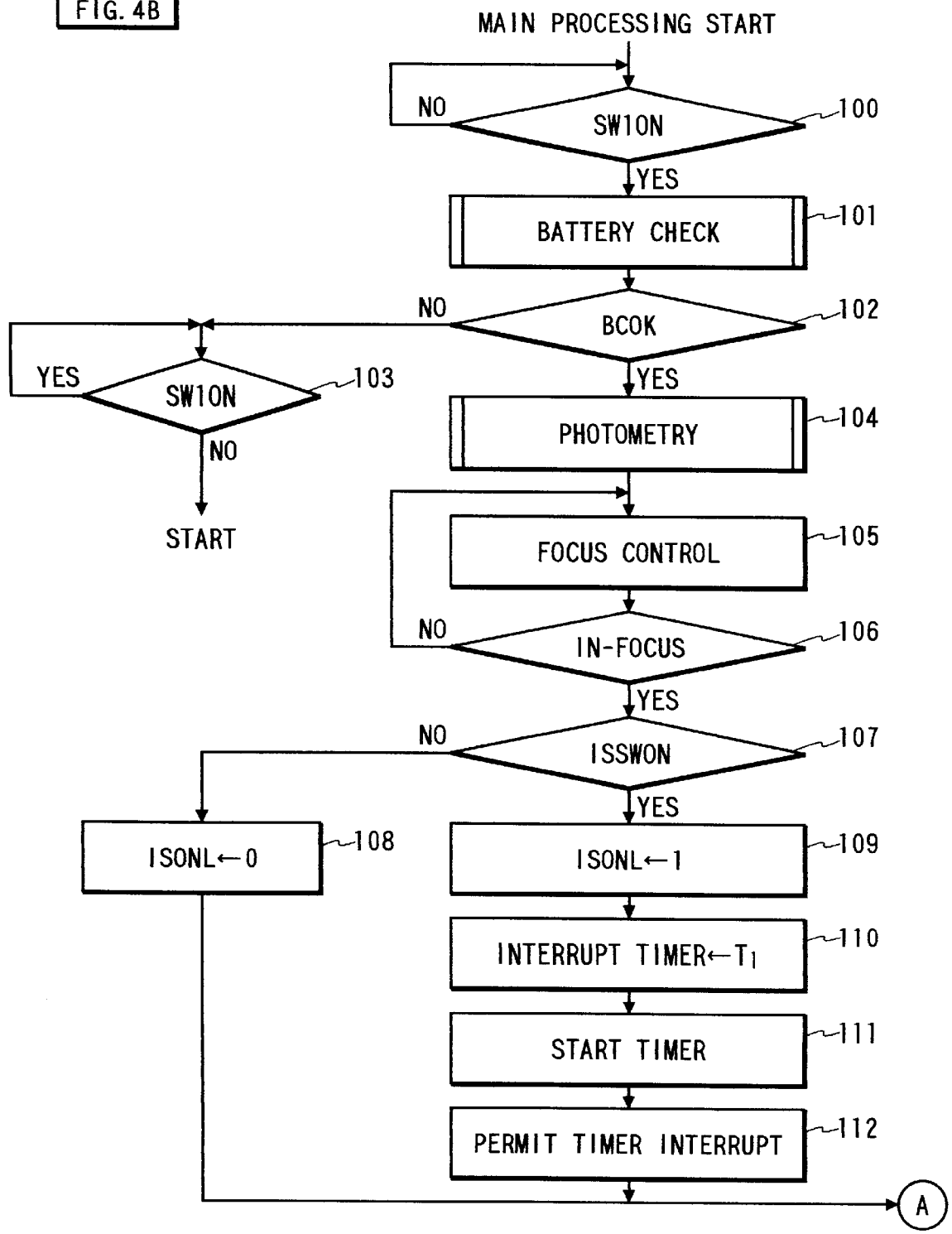
FIG. 4 is comprised of FIGS. 4A and 4B showing flow charts of the operation of a CPU 1 shown in FIG. 1B in the first embodiment of the present invention.
Figure 4B:
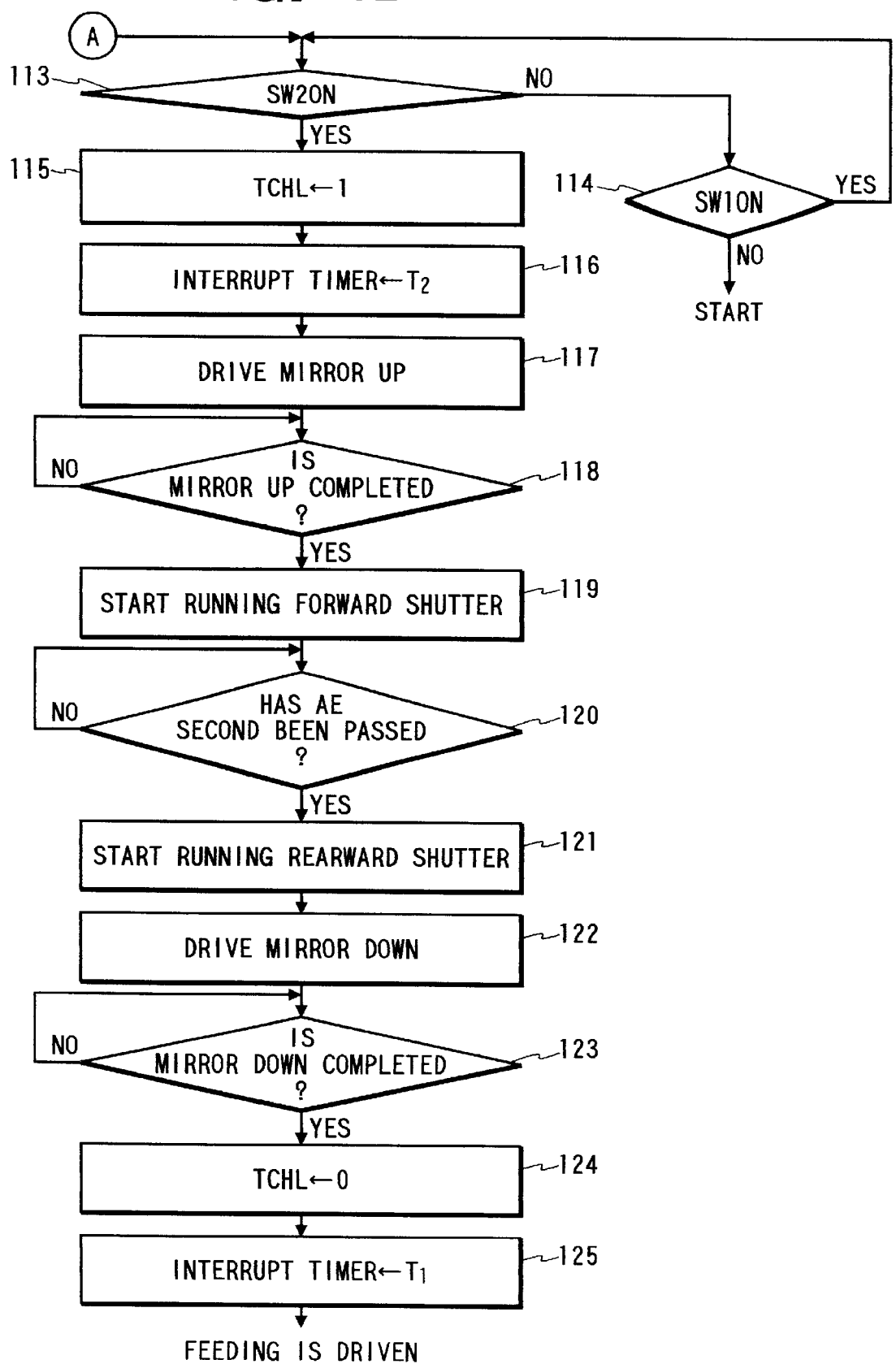
Figure 5:
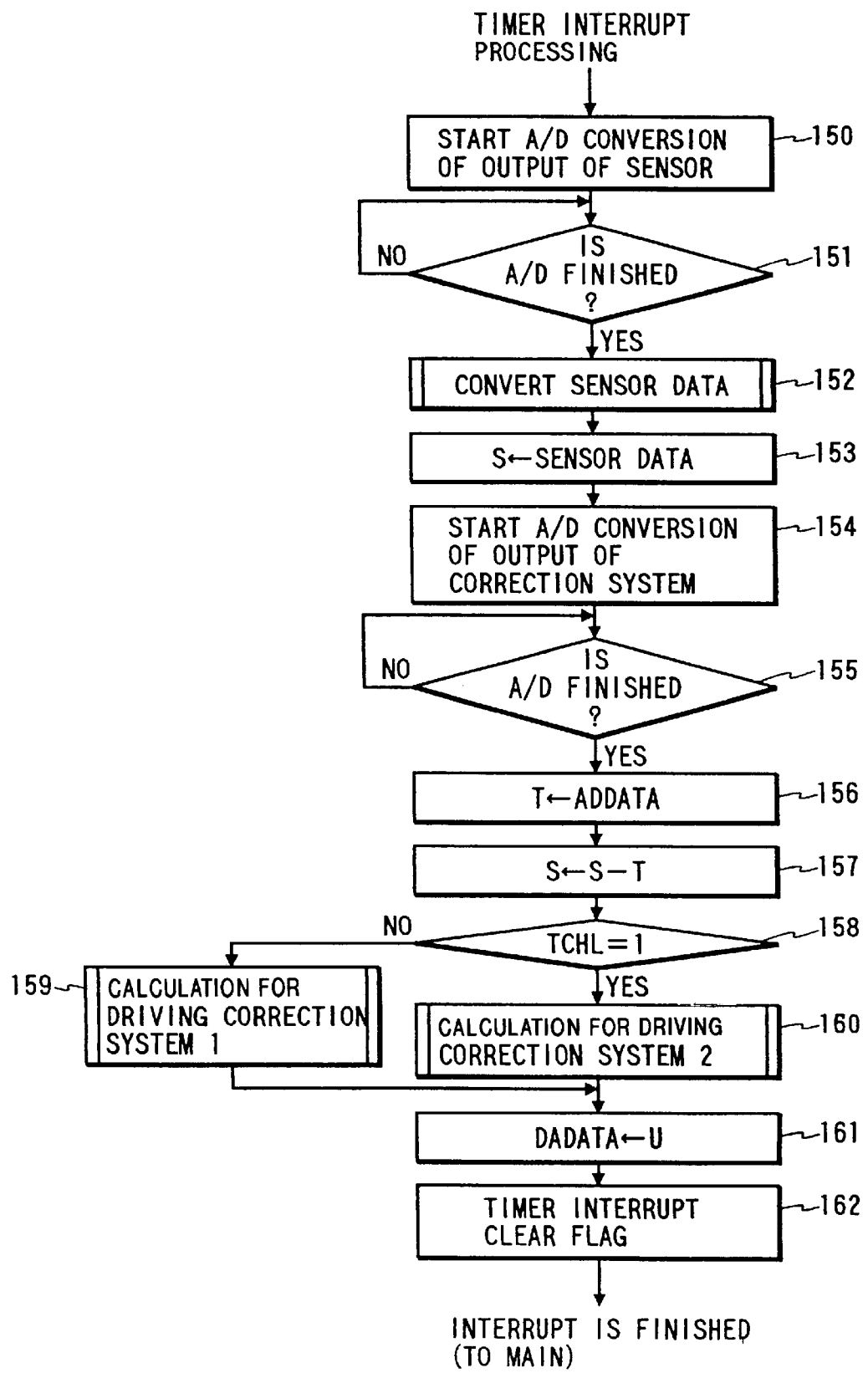
FIG. 5 is a flow chart showing the operation of the CPU 1 shown in FIG. 1B in the first embodiment of the present invention.

The operation of the timer interrupt processing will be described below with reference to the flow chart in FIG. 5. When an interrupt request is generated to the CPU 1 every predetermined time $T_1$, the operation immediately shifts from the main processing in FIGS. 4A and 4B to the timer interrupt processing in FIG. 5 in the CPU 1.

In step 150, as shown in FIGS. 1A and 1B, the A/D conversion operation of the output value (e.g., the output from the integration means 6) of the sensor is started. It is checked in step 151 if this conversion is finished. In step 152, the conversion result is converted into a predetermined data format, and the conversion result is set in an S register in the CPU 1 (for example, data may be converted into the form of a complementary number of 2 to express a negative value, or may be multiplied by a given constant to attain sensitivity correction of the sensor).

In step 154, an A/D conversion operation of the output from the correction optical system position detection means 24 shown in FIG. 1A is similarly started. It is checked in step 155 if this conversion is finished. In step 156, the conversion result is set in a T register.

In this manner, the output value of the sensor and the absolute position output of the correction optical system at that time, which are retrieved as data in the CPU 1, are controlled to always become equal to each other upon execution of the image blur prevention operation. Thus, in step 157, the value in the T register in which the position output of the correction optical system is set is subtracted from the value of the S register in which the value corresponding to the sensor data is set, and the difference is set in the S register again.

In step 158, the value of an internal latch TCHL (initially set to be 0) of the CPU 1 is checked. If this value is reset to 0, the flow advances to step 159 to execute the processing of calculation 1 for driving the correction system.

Figure 6:
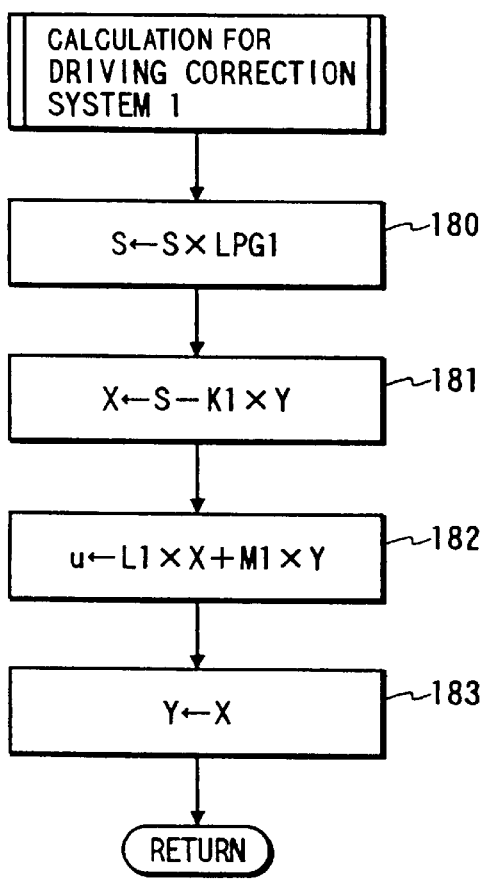
FIG. 6 is a flow chart showing the operation of the CPU 1 shown in FIG. 1B in the first embodiment of the present invention.

The processing of calculation 1 for driving the correction system will be described below with reference to the flow chart in FIG. 6. In step 180, the value of the S register in which the difference between the sensor output and the position output of the correction optical system is set is multiplied by loop gain setting constant LPGl required for executing the feedback control of the correction optical system, and the product is set in the S register again.

Steps 181 to 183 are associated with a phase compensation control calculation for preventing oscillation of this feedback control. Constant values K1, L1, and M1 used in these steps are set by known S-Z transformation from values in the frequency domain on the basis of the timer interrupt time $T_1$, i.e., the data sampling time $T_1$, so as to obtain predetermined frequency characteristics (for example, a phase lead angle of (°) at a given frequency in phase lead compensation).

In step 181, the product of the constant value K1 and the value of a Y register set in the immediately preceding interrupt processing is subtracted from the value of the S register, and the difference is set in an X register for calculation.

In step 182, the product of the value of the constant value L1 and the value of the X register is added to the product of the constant value M1 and the value of a Y register, and a final output is set in a u register.

In step 183, the value of the X register is set in the Y register for the next interrupt control, and the operation of calculation 1 for driving the correction system ends.

In this manner, in calculation 1 for driving the correction system, the calculation for the correction optical system driving control is executed on the basis of the sampling time $T_1$. Upon completion of this calculation, since the calculation result is transferred to the D/A converter 17 as DADATA of the value of the U register in step 161, the correction optical system driving means 25 is driven on the basis of the output from the D/A converter 17, and electric power is supplied to the coil 26, thereby moving the correction optical system 23. Finally, in the interrupt processing in FIG. 5, a flag, which was automatically set upon generation of the timer interrupt, is cleared in step 162, thus ending the interrupt operation.

On the other hand, if it is determined in step 113 that the switch SW2 of the camera is ON, since the camera sequence itself starts a shutter release operation, the flow advances to step 115, and a clock switching circuit 22 in FIG. 1B sets the internal latch TCHL of the CPU 1 to be 1. In step 116, the time of the above-mentioned interrupt timer is changed to be $T_2$ ($<T_1$). Therefore, in the timer interrupt processing operation in FIG. 5 in this case, since it is determined in step 158 that TCHL=1, calculation 2 for driving the correction system is executed.

Figure 7:
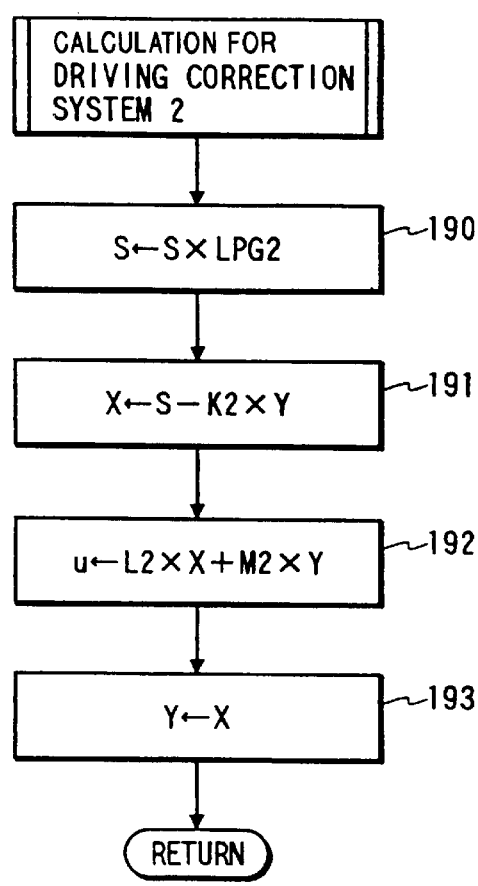
FIG. 7 is a flow chart showing the operation of the CPU 1 shown in FIG. 1B in the first embodiment of the present invention.

The operation of calculation 2 for driving the correction system will be described below with reference to the flow chart in FIG. 7. Constant values K2, M2, and L2 used in steps 190 to 193 play substantially the same roles as K1, M1, and L1 above. In this case, the timer interrupt time is set to be $T_2$, i.e., the sampling time $T_2$, so as to realize predetermined phase lead compensation.

In step 190, the value of the S register in which the difference data between the sensor output and the position output of the correction optical system is set is multiplied by a constant LPG2 for executing the feedback control of this correction optical system. In step 191, the product of the constant value K2 and the value of the Y register, which is set in the immediately preceding interrupt processing, is subtracted from the value of the S register, and the difference is set in the X register.

In step 192, the product of the constant L2 and the value of the X register is added to the product of the constant M2 and the value of the Y register, and the sum is set in the U register. Finally, in step 193, the value of the X register is set in the Y register for the next interrupt processing. In this manner, when the switch SW2 is turned on, and the actual shutter release operation is started, the processing for driving the correction system is executed at a sampling period shorter than that in a normal state.

Figure 8:
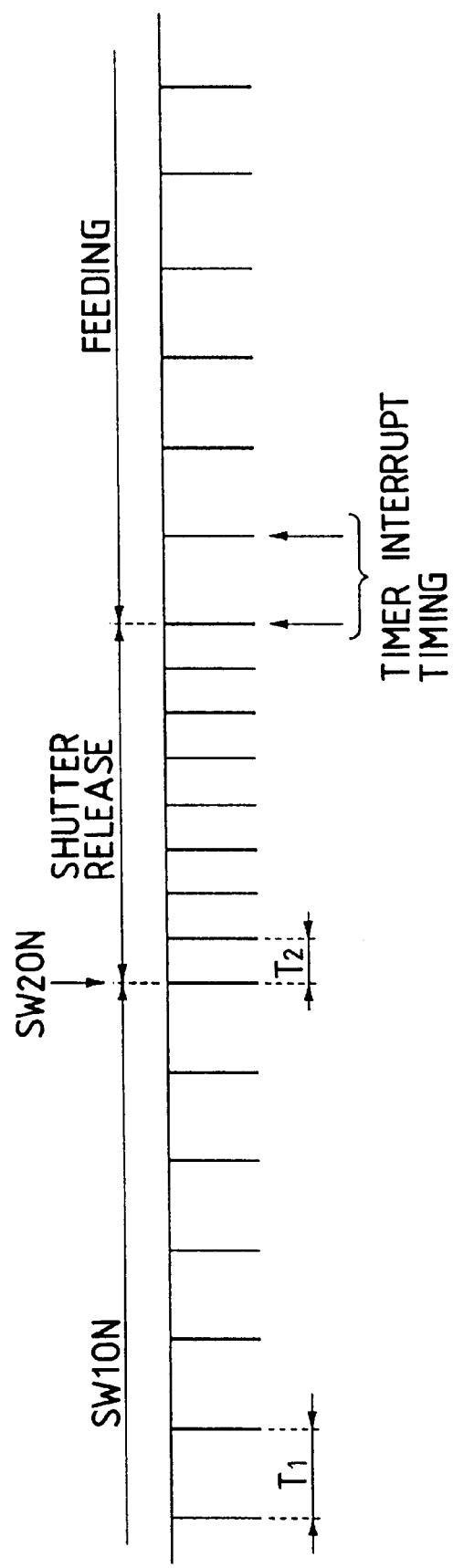
FIG. 8 is a chart for explaining the timer interrupt timing.

FIG. 8 shows the sampling timings in this case. While the switch SW1 is ON, an interrupt operation is executed every period $T_1$, and when the switch SW2 is turned on, and a shutter release operation is started, an interrupt operation is executed every period $T_2$ shorter than $T_1$.

Referring back to FIGS. 4A and 4B, when a mirror-up driving operation is started in step 117, the main mirror 11 is moved upward. If it is detected in step 118 that the mirror-up operation is completed, running of the forward shutter is started in response to a control signal from the CPU 1 via a shutter driving means 15 in step 119. It is checked in step 120 if the AE time set via the photometry means 14 has passed. If Y in step 120, running of the rearward shutter is started in step 121. After an elapse of a predetermined period of time, the shutter exposure operation is completed.

In step 122, a mirror-down driving operation is executed to move the mirror located at the upper position downward. If it is detected in step 123 that the mirror-down operation is completed, the internal latch TCHL of the CPU 1 is reset to 0 again in step 124, and the time $T_1$ is set in the interrupt timer by the clock switching circuit 22 in step 125. Therefore, upon completion of the shutter release operation, the timer interrupt time is set to be $T_1$ again, as shown in FIG. 8, and calculation 1 for driving the correction system is executed in the flow chart in FIG. 5.

As described above, in this embodiment, the data sampling period for the shutter release interval is set to be different from that for other intervals, thereby reducing the load on the CPU. In addition, it is also effective to switch this processing between the focus control state with a heavy load on the CPU 1 and other states. In the description of the operation of this embodiment, the vibration sensor and the correction optical system for only one axis direction have been described. Of course, the detection and correction operations for two or more axes are similarly executed.

SECOND EMBODIMENT

Figure 9B:
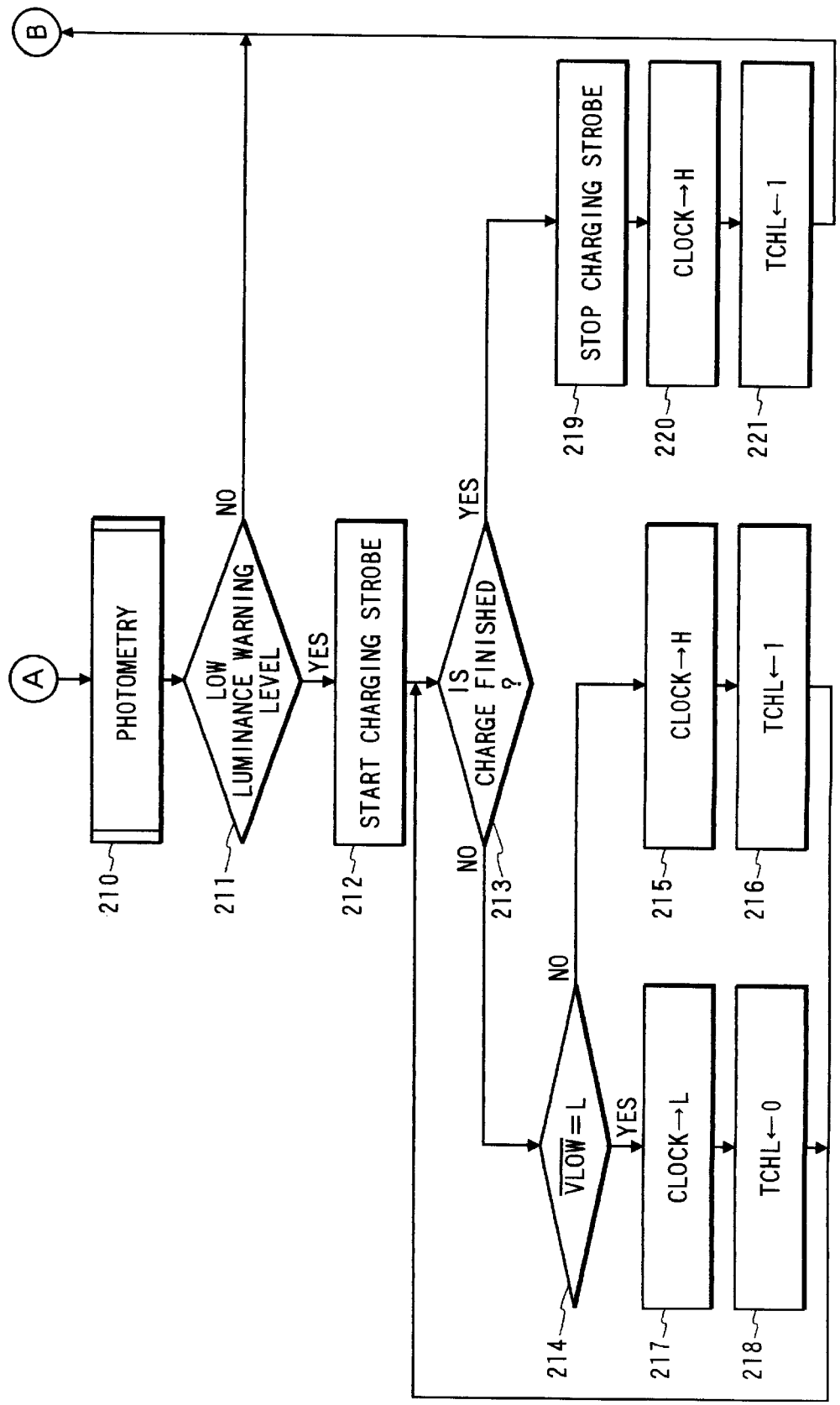
FIG. 9 is comprised of FIGS. 9A and 9B showing flow charts of the operation of the CPU 1 shown in FIG. 1B in the second embodiment of the present invention.
Figure 10:
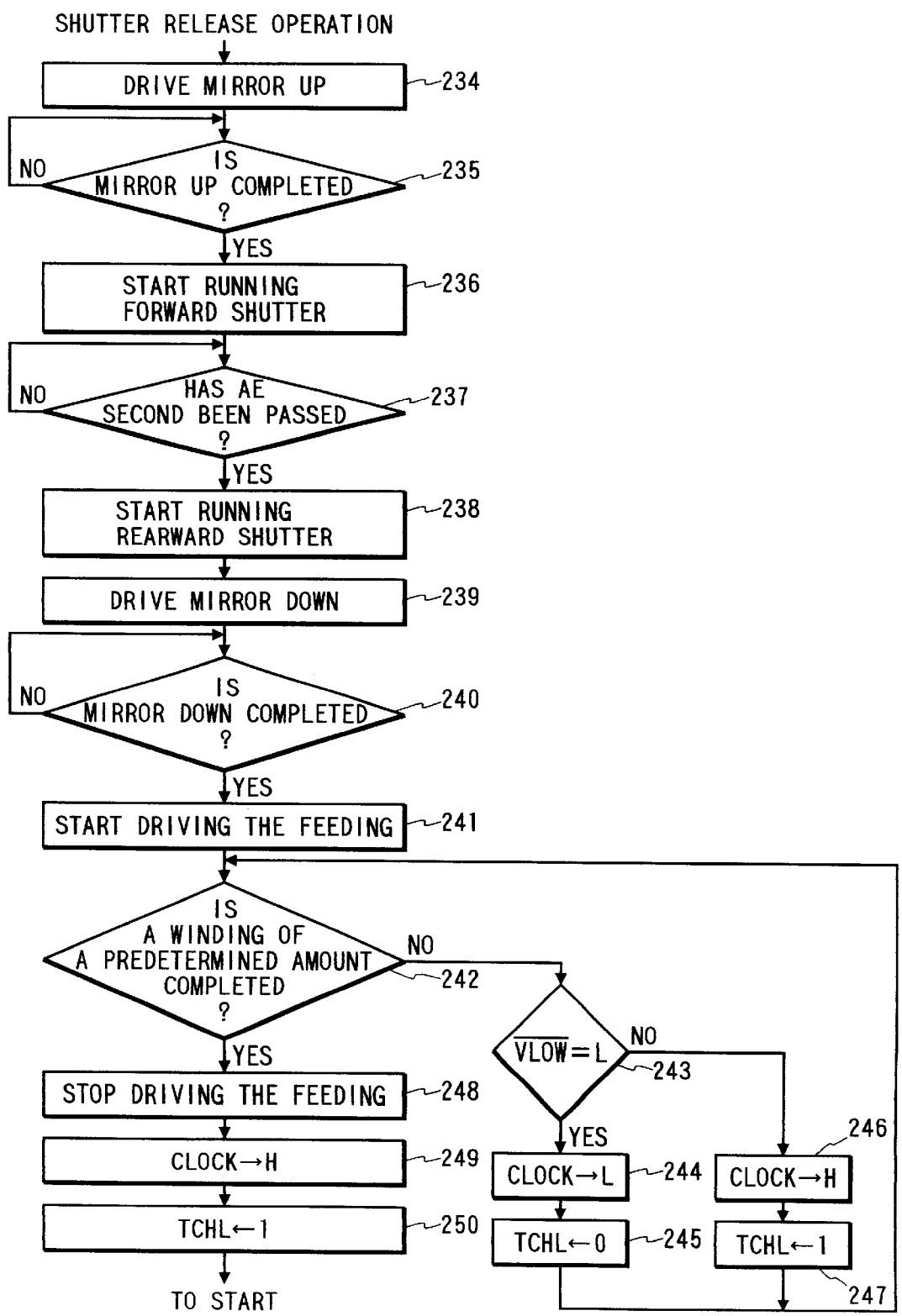
FIG. 10 is a flow chart showing the operation of the CPU 1 shown in FIG. 1B in the second embodiment of the present invention.

The operation of the second embodiment of the present invention will be described below with reference to FIGS. 9A, 9B and 10.

Since the image blur prevention system itself is the same as that in the first embodiment, a detailed description thereof will be omitted. Similarly, steps 200 to 203 in FIG. 9A are the same as steps 100 to 103 in the first embodiment, and steps 204 to 209 are the same as steps 107 to 112 in the first embodiment. In these steps, the battery check operations for guaranteeing the operation of the entire camera system is performed.

In step 210, as has been described in the first embodiment, the object luminance level detected by the photometry means 14 via the correction optical system 23 and the photographing optical system 10 is retrieved by the CPU 1 via the A/D converter 2. In step 211, it is checked if this luminance level corresponds to a normal AE photographing level or a strobe photographing level (i.e., a so-called low luminance warning level). If the detected luminance level is equal to or higher than a predetermined luminance level, the flow immediately advances to step 222; otherwise, the flow advances to step 212 to start a strobe charging operation. The strobe charging control is started by a combination of a booster circuit and a main capacitor included in a strobe control means 30 in response to a control signal from the CPU 1, as shown in FIG. 1B.

In step 213, it is checked if the charging operation on the main capacitor is finished. If N in step 213, the level of an output $\overline{\text{VLOW}}$ from a voltage detector 33 is checked in step 214. The voltage detector 33 checks the level of a power supply battery 32 of the camera. When the power supply voltage of the camera drops during the strobe charging operation or the film feeding operation, the system clock is switched to guarantee the operation of the CPU 1.

Therefore, if it is detected in step 214 that the output $\overline{\text{VLOW}}$ is at H level, it is determined that the power supply voltage is high enough to guarantee the operation of the CPU 1, and the output from the clock switching circuit 22 in the CPU 1 changes to H in step 215, thus selecting a high-speed clock operation.

In step 216, the internal latch TCHL is set to be 1. Thus, in the timer interrupt operation described in the first embodiment (a detailed description of timer interrupt for actually executing the image blur prevention operation will be omitted since it is the same as that shown in FIGS. 5, 6, and 7), calculation 2 for driving the correction system in step 160 is executed after step 158. In calculation 2 for driving the correction system, as shown in FIG. 7, the constant values K2, L2, and M2 are set under the assumption of a shorter sampling time ($T_2$ in the first embodiment). In this case, when the reference clock is at H level, sampling is performed every time a timer 2 setting value Ta (set in step 207) is counted. Therefore, the image blur prevention operation is executed at a shorter data sampling interval.

On the other hand, if it is detected in step 214 that the output $\overline{\text{VLOW}}$ is at L level, it is determined that the power supply voltage is not high enough to guarantee the operation of the CPU 1, and the output from the clock switching circuit 22 in the CPU 1 changes to L in step 217, thus selecting a low-speed clock operation. Subsequently, since the internal latch TCHL is reset to 0 in step 218, it is detected in step 158 in the timer interrupt operation shown in FIG. 5 that TCHL= 0, and thereafter, calculation 1 for driving the correction system is executed in step 159. In calculation 1 for driving the correction system, the constant values K1, L1, and M1 are set under the assumption of a longer sampling time ($T_1$ in the first embodiment), as shown in FIG. 6. In this case, when the reference clock is at L level, sampling is performed every time the timer setting value Ta is counted. For this reason, the image blur prevention control operation is executed at a longer sampling interval.

Upon repetition of the above-mentioned operations, if it is detected in step 213 that the charging operation of the strobe main capacitor is finished, the flow advances to step 219 to stop the charging operation of the strobe.

Furthermore, the clock is set at H level in step 220, and the latch TCHL is set to be 1 in step 221. As described above, the CPU 1 is set in a high-speed mode, and at the same time, the data sampling speed in the image blur prevention operation is also set to be high.

In steps 222 to 231, the operations associated with focus control are executed as in the first embodiment. In this case, as described above, the clock speed is switched in correspondence with the output level of the power supply battery 32, and at the same time, the operation speed of the image blur prevention control, i.e., the sampling time for sampling data such as the sensor output and the position output of the correction optical system is changed.

In steps 232 and 233, it is checked if the switch SW2 of the camera, which is used for actually starting the shutter release operation, is ON. If the switch SW2 is ON, the flow immediately advances to step 234 in FIG. 10 to start the shutter release operation. Since steps 234 to 240 are the same as steps 117 to 123 in FIG. 4B, a detailed description thereof will be omitted. Upon completion of the shutter release operation, an actual film feeding operation is started by a feeding control means 28 and a feeding motor 29 in step 241.

It is checked in step 242 if a winding operation of a predetermined amount is completed. If N in step 242, the flow advances to step 243 to check the output $\overline{\text{VLOW}}$ from the voltage detector 33. Therefore, in this case, as in the above-mentioned strobe charging operation, the speed of the image blur prevention control operation, i.e., the data sampling speed is changed depending on the state of the power supply battery 32 in steps 243 to 247.

If it is detected in step 242 that the winding operation of the predetermined amount is completed, energization to the feeding motor 29 is stopped in step 248. Thereafter, the clock is set at H level in step 249, and the latch TCHL is set to be 1 in step 250. Thus, the image blur prevention control is achieved by high-speed sampling again.

As described above, in this embodiment, the power supply voltage is checked in the sequence operation of the camera, and the data sampling speed, i.e., the speed of the image blur prevention control operation, is automatically changed depending on whether or not the CPU 1 can operate at high speed.

THIRD EMBODIMENT

Figure 11:
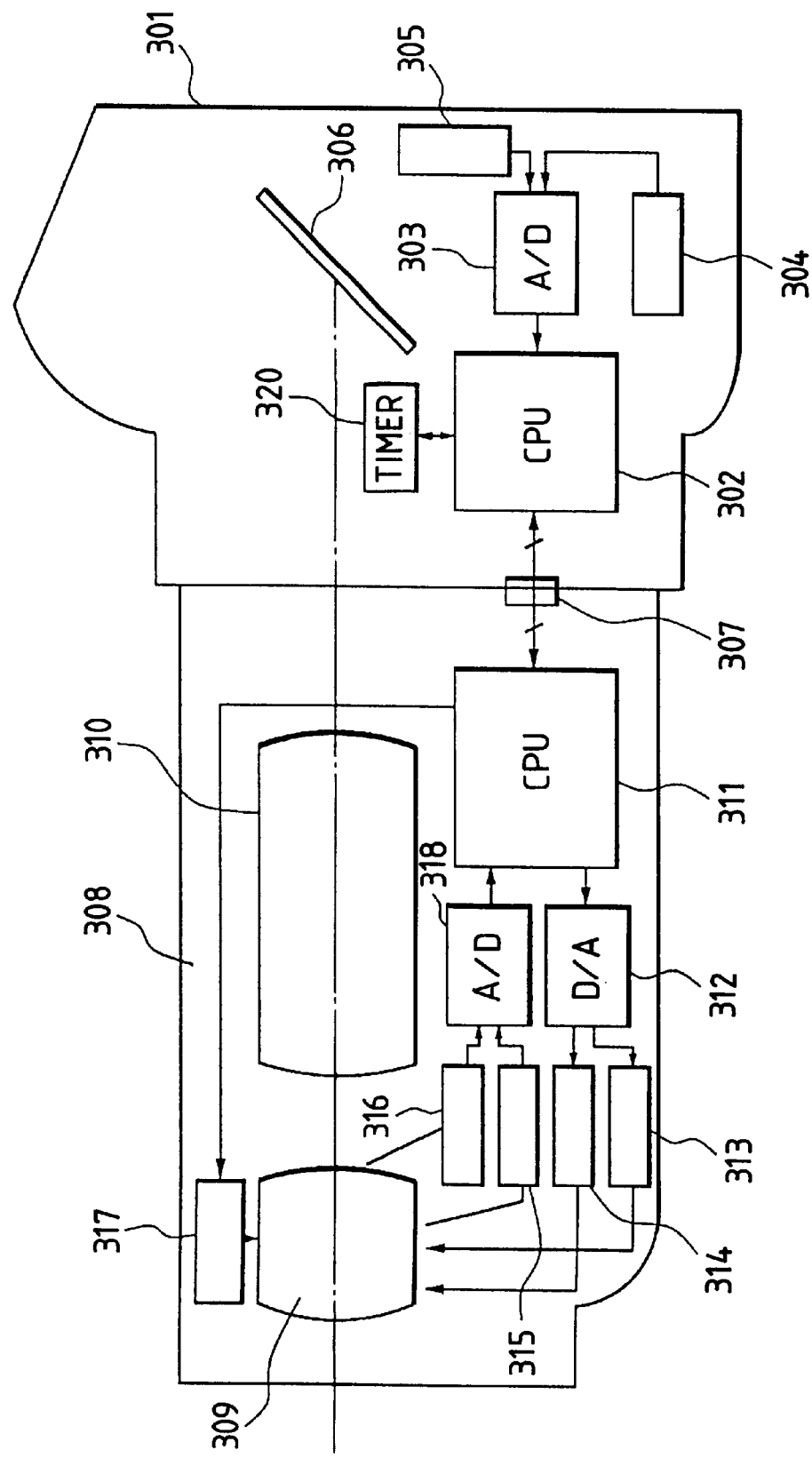
FIG. 11 is a block diagram showing the overall arrangement according to the third embodiment of the present invention.

FIG. 11 shows the overall arrangement according to the third embodiment of the present invention. This embodiment relates to an image blur prevention system in a camera with an exchangeable lens, in which a vibration sensor is incorporated in a camera main body, and a correction optical system for optically correcting an actual vibration on the basis of an output from the vibration sensor is incorporated in a lens main body.

A camera main body 301 includes a CPU 302 for controlling the entire camera and signal processing of vibration sensors 304 and 305 for detecting any vibration of the entire camera. These sensors are arranged, as shown in FIG. 11. The outputs from these sensors are converted into digital data by an A/D converter 303 at predetermined time intervals $T_1$ on the basis of a timing signal from a timer 320 for executing an interrupt operation to the CPU 302 at the predetermined time intervals $T_1$. The sensor data retrieved by the CPU 302 are subjected to calculations such as predetermined level conversion, and thereafter, are transferred to a CPU 311 in an exchangeable lens 308 via a signal line connecting the camera main body 301 and the exchangeable lens 308.

FIGS. 12A and 12B are timing charts showing this communication state. In FIGS. 12A and 12B, SCK represents the synchronous clock for a serial communication, SD0 represents serial data transferred from the camera main body to the lens side, and SD1 represents serial data transferred from the lens side to the camera side at the same time or a signal indicating completion of data reception from the camera side.

In this case, as shown in FIG. 12A, a kind of command data indicating that sensor output data are transmitted to the lens side at the transmission period of vibration sensor data, i.e., at the time interval $T_1$ is transmitted from the camera to the lens, and after reception of this data, the CPU 311 executes the control operation of the correction optical system 309 on the basis of the sampling time $T_1$.

The control operation of the correction optical system in the exchangeable lens 308 will be briefly described below. In a normal inoperative state, the correction optical system 309 is mechanically locked by a mechanical lock means 317. When this lock state is released by a control signal from the CPU 311, the absolute position of the correction optical system is detected by position detection means 315 and 316, and the outputs from these detection means are retrieved by the CPU 311 via an A/D converter 318.

As described above, the CPU 311 compares the sensor data supplied from the camera side at the predetermined time intervals $T_1$ with the position output data of the correction optical system, and executes a predetermined feedback calculation (the respective calculation constants are set based on the sampling time $T_1$), as described in the first embodiment.

The calculation result is transferred to a D/A converter 312, and the correction optical system 309 is driven based on the output from the D/A converter 312 via correction optical system driving means 313 and 314. Therefore, in this case, since the sensor data are received at the predetermined time intervals $T_1$, and the position data of the correction optical system are fetched simultaneously with this reception, image blur prevention control is executed at the predetermined time intervals $T_1$.

When the operation speed of the CPU 302 in the camera main body cannot be increased in association with another camera sequence, the timer 320 for executing an interrupt operation to the CPU 302 in the camera main body is set to be a predetermined time $T_2$ ($>T_1$ in this case). Therefore, in this case, the outputs from the vibration sensors 304 and 305 are fetched by the CPU 302 via the A/D converter 303 at the predetermined time intervals $T_2$.

FIG. 12B shows the reception state of the sensor data in the exchangeable lens. Since the transmission period of the vibration sensor data is changed from $T_1$ to $T_2$, command data for setting this sampling time $T_2$ is transmitted first.

When the CPU 311 receives this data, the respective constants of the image blur prevention control operation in the CPU 311 are re-set so that calculation control is executed based on the sampling time $T_2$. In this case, since the sensor data are received at the predetermined time intervals $T_2$, and the position data sampling operation of the correction optical system is executed simultaneously with the reception, the image blur prevention control is executed at the predetermined time intervals $T_2$.

As described above, in this embodiment, in the exchangeable lens type image blur prevention system which has the vibration sensors in the camera main body, and has the correction optical system in the lens, the transfer period of sensor data transmitted from the camera to the lens is changed depending on the operation state of the camera main body.

The present invention can be applied to a single-lens reflex camera, a lens-shutter camera, a video camera, optical equipment other than cameras, other devices, and a unit constituting a given device.

In the present invention, all or some of the arrangements of the claims or embodiments may be arranged in different apparatuses. For example, a vibration detection device for image blur prevention may be arranged in a camera main body, a vibration correction device may be arranged in a lens barrel attached to the camera, and a controller for controlling these devices may be arranged either divisionally in the camera main body and the lens barrel or in one of them, or may be arranged in another detachable device such as an intermediate adapter.

The present invention is not limited to the vibration prevention means for directly preventing a vibration. For example, the present invention may comprise means for indirectly preventing generation of a vibration in such a manner that an alarm indicating that a vibration is actually generated or may be generated is generated by means of light, sound, or the like to call the user's attention.

The present invention is not particularly limited to the type of vibration detection means as long as a vibration can be detected. For example, an angular accelerometer, an accelerometer, an angular velocimeter, a velocimeter, an angular displacement meter, a displacement meter, a method of detecting a vibration itself of an image, and the like may be used.

The present invention is not particularly limited to the type of vibration prevention means as long as a vibration can be prevented. For example, light beam changing means such as a shift optical system for moving an optical member in a plane perpendicular to the optical axis, a variable apex angle prism, means for moving the photographing surface in a plane perpendicular to the optical axis, means for correcting a vibration by image processing, and the like may be used.

In each of the above embodiments, the load on the calculation circuit for performing a distance measurement calculation and focus control is taken into account. The present invention may be similarly applied to a calculation circuit for performing a calculation for another function, e.g. a visual axis input function.

In each of the embodiments described above, steps 104 and 105 or steps 210 and 222 of the CPU 1 correspond to. the calculation circuit of the present invention, and the clock switching circuit 22 corresponds to the control means of the present invention.

The correspondence between the arrangements of the embodiments and the arrangement of the present invention has been described. However, the present invention is not limited to the arrangements of these embodiments, but may be applied to any other arrangements as long as the functions presented in the claims or the functions of the arrangements of the embodiments can be achieved.

The embodiments or their technical components may be combined as needed.

As described above, according to the control apparatus for the camera or optical equipment in each of the above-mentioned embodiments of the present invention, since the signal input time interval to the calculation circuit is varied in consideration of the load on the calculation circuit, the calculation circuit can be prevented from being overloaded, and the calculation circuit can always be operated in an appropriate load state.

Since the signal input time interval is changed to be different from a normal time interval in consideration of the load on the calculation circuit, the calculation circuit can always be operated in a load state equivalent to that in a normal state.

Since the signal input time interval for image blur prevention control is changed in consideration of the load on the calculation circuit, the calculation circuit can always execute a calculation for image blur prevention operation control in an appropriate load state.

Since the signal input time interval of the calculation circuit for performing a calculation for exposure control is shortened upon execution of an actual exposure control operation, the calculation circuit can be efficiently operated.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
   a blur detection unit that detects blur and outputs a blur signal;
   an image blur prevention device;
   a shutter member that performs an exposure operation onto a recording medium;
   sampling means for sampling the blur signal output by said blur detection unit, and for changing a sampling period for sampling the blur signal before an exposure operation of said shutter member and during the exposure operation; and
   driving means for driving said image blur prevention device so as to perform an image blur prevention operation on the basis of the blur signal sampled by said sampling means.

2. A camera according to claim 1, further comprising an operation member operable to start an exposure operation by said shutter member, wherein said sampling means changes the sampling period for sampling the blur signal in response to operation of said operation member.

3. A camera according to claim 1, wherein the sampling period during an exposure operation is shorter than the sampling period before the exposure operation.

4. An apparatus adapted to a camera having a shutter member for performing an exposure operation onto a recording medium, said apparatus comprising:
   a blur detection unit that detects blur and outputs a blur signal;
   an image blur prevention device;
   sampling means for sampling the blur signal output by said blur detection unit, for changing a sampling period for sampling the blur signal before an exposure operation of said shutter member, and for changing the sampling period for sampling the blur signal during the exposure operation; and
   driving means for driving said image blur prevention device so as to perform an image blur prevention operation on the basis of the blur signal sampled by said sampling means.

5. An apparatus according to claim 4, further comprising an operation member operable to start an exposure operation by said shutter member, wherein said sampling means changes the sampling period for sampling the blur signal in response to operation of said operation member.

6. An apparatus according to claim 4, wherein the sampling period during an exposure operation is shorter than the sampling period before the exposure operation.

7. A camera controlled by a power supply voltage comprising:
   a blur detection unit that detects blur and outputs a blur signal;
   an image blur prevention device;
   a voltage detection circuit that detects a voltage level of said power supply voltage;
   sampling means for sampling the blur signal output by said blur detection unit, for changing a sampling period for sampling the blur signal when said voltage detection circuit detects that the voltage level is higher than a predetermined value, and for changing the sampling period for sampling the blur signal when said voltage circuit detects that the voltage level is not higher than a predetermined value; and
   driving means for driving said image blur prevention device so as to perform an image blur prevention operation on the basis of the blur signal sampled by said sampling means.

8. A camera according to claim 7, wherein the sampling period for sampling the blur signal when the detected voltage is higher than a predetermined value is shorter than the sampling period for sampling the blur signal when the detected voltage is not higher than a predetermined value.

9. A camera having a voltage detection circuit for detecting a voltage level of a power supply voltage, said camera being controlled by said power supply voltage and comprising:
   a blur detection unit that detects blur and outputs a blur signal;
   an image blur prevention device;
   sampling means for sampling the blur signal output by said blur detection unit, for changing a sampling period for sampling the blur signal when the voltage detection circuit detects a voltage level of the power supply voltage is higher than a predetermined value, and for changing the sampling period for sampling the blur signal when the voltage detection circuit detects that the voltage level is not higher than a predetermined value; and
   driving means for driving said image blur prevention device so as to perform an image blur prevention operation on the basis of the blur signal sampled by said sampling means.

10. A camera according to claim 9, wherein the sampling period for sampling the blur signal when the detected voltage is higher than a predetermined value is shorter than the sampling period for sampling the blur signal when the detected voltage is not higher than a predetermined value.

* * * * *

UNITED STATES PATENT AND TRADEMARK OFFICE
CERTIFICATE OF CORRECTION

PATENT NO. : 6,320,613 B1
DATED : November 20, 2001
INVENTOR(S) : Yasuhiko Shiomi It is certified that error appears in the above-identified patent and that said Letters Patent is hereby corrected as shown below:

Title page,
Item [56], References Cited, U.S. PATENT DOCUMENTS,
"Okada et al." should read -- Okada et al. --.
Item [57], ABSTRACT,
Line 7, "relativelylong" should read -- relatively long --.

Column 10,
Line 34, "to." should read -- to --.

Signed and Sealed this

Twenty-third Day of April, 2002

*Attest:*

*Attesting Officer*

JAMES E. ROGAN
*Director of the United States Patent and Trademark Office*